United States Patent
Alix et al.

(10) Patent No.: US 6,605,263 B2
(45) Date of Patent: Aug. 12, 2003

(54) SULFUR DIOXIDE REMOVAL USING AMMONIA

(75) Inventors: Francis R. Alix, Rye, NH (US); Joanna L. Duncan, Sanford, ME (US); Christopher R. McLarnon, Exeter, NH (US)

(73) Assignee: Powerspan Corp., New Durham, NH (US)

(*) Notice: Subject to any disclaimer, the term of this patent is extended or adjusted under 35 U.S.C. 154(b) by 0 days.

(21) Appl. No.: 09/683,663

(22) Filed: Jan. 31, 2002

(65) Prior Publication Data

US 2003/0108469 A1 Jun. 12, 2003

Related U.S. Application Data

(63) Continuation-in-part of application No. 09/683,267, filed on Dec. 6, 2001.

(51) Int. Cl.$^7$ .............................................. C01B 17/20
(52) U.S. Cl. .................................. 423/243.06; 423/547
(58) Field of Search ............................ 423/243.06, 547

(56) References Cited

U.S. PATENT DOCUMENTS

| | | | |
|---|---|---|---|
| 4,028,071 A | 6/1977 | Langlois ........................ 55/89 |
| 4,029,482 A | 6/1977 | Postma et al. .................. 55/2 |
| 4,029,739 A | 6/1977 | Senjo et al. ................ 423/235 |
| 4,035,470 A | 7/1977 | Senjo et al. ................ 423/235 |
| 4,120,671 A | 10/1978 | Steinmeyer .................... 55/96 |
| 4,155,726 A | 5/1979 | Steinmeyer .................. 55/242 |
| 4,193,774 A | 3/1980 | Pilat ............................. 55/10 |
| 4,345,916 A | 8/1982 | Richards et al. ............... 55/5 |
| 4,435,260 A | 3/1984 | Koichi et al. .............. 204/164 |
| 4,650,555 A | 3/1987 | Rzad et al. ................. 204/174 |
| 4,690,807 A * | 9/1987 | Saleem ....................... 423/242 |
| 4,726,940 A | 2/1988 | Kobayashi ................. 423/240 |
| 4,735,927 A | 4/1988 | Gerdes et al. ................ 502/64 |
| 4,735,930 A | 4/1988 | Gerdes et al. ................ 502/78 |
| 4,806,320 A | 2/1989 | Nelson ........................ 423/239 |
| 4,892,718 A | 1/1990 | Peter et al. .................. 423/235 |
| 4,971,777 A | 11/1990 | Firnhaber et al. ........... 423/235 |
| 5,023,063 A | 6/1991 | Stiles ......................... 423/239 |
| 5,176,888 A | 1/1993 | Stiles ......................... 423/239 |
| 5,229,091 A | 7/1993 | Buchanan et al. ...... 423/244.01 |
| 5,308,385 A | 5/1994 | Winn ........................... 95/195 |
| 5,362,458 A | 11/1994 | Saleem et al. .......... 423/243.06 |
| 5,547,648 A | 8/1996 | Buchanan et al. ........... 423/210 |
| 5,624,649 A | 4/1997 | Gal ......................... 423/243.11 |
| 5,658,547 A | 8/1997 | Michalak et al. ....... 423/243.08 |
| 5,715,764 A | 2/1998 | Lyngfelt et al. ............. 110/245 |
| 5,753,012 A * | 5/1998 | Firnhaber et al. .............. 95/65 |
| 5,792,238 A | 8/1998 | Johnson et al. ................ 95/60 |
| 5,846,301 A | 12/1998 | Johnson et al. ................ 96/52 |
| 5,871,703 A | 2/1999 | Alix et al. ................... 423/210 |

(List continued on next page.)

FOREIGN PATENT DOCUMENTS

| | | | | |
|---|---|---|---|---|
| DE | 37 33 319 A1 | * | 4/1989 | ............ A62D/3/00 |
| WO | WO-99/47268 A1 | | 9/1999 | |
| WO | WO-01/87464 A1 | | 11/2001 | |
| WO | WO-02/062453 A1 | | 8/2002 | |

OTHER PUBLICATIONS

Lee, etal. "The Effect of In Situ Generated Ammonia—Sulfur Aero sols on the Removal of NOx in a Wet ESP", Aug. 20, 2001, Mega Symposium, Chicago, IL pp. 1–11.

*Primary Examiner*—Stanley S. Silverman
*Assistant Examiner*—Timothy C. Vanoy
(74) *Attorney, Agent, or Firm*—Phillip E. Decker

(57) ABSTRACT

A process and apparatus for removing $SO_2$ from a gas stream having the steps of scrubbing the $SO_2$ with an ammonia scrubbing solution and removing any aerosols generated by the scrubbing in a wet electrostatic precipitator. The scrubbing solution is maintained at a pH between 6 and 8 to increase the speed of absorption of $SO_2$, to Increase the ratio of sulfite to bisulfite which also facilitates the oxidation of $SO_2$, and to avoid the need to use exotic, corrosion resistant alloys. Ammonium sulfate, a valuable fertilizer, can be withdrawn from the scrubbing solution.

3 Claims, 4 Drawing Sheets

U.S. PATENT DOCUMENTS

| | | |
|---|---|---|
| 6,063,352 A | 5/2000 | Risse et al. ............. 423/243.06 |
| 6,117,403 A | 9/2000 | Alix et al. .................. 423/210 |
| 6,132,692 A | 10/2000 | Alix et al. .................. 423/210 |
| 6,159,440 A | 12/2000 | Schoubye .................. 423/514 |
| 6,168,709 B1 | 1/2001 | Etter .......................... 208/131 |
| 6,183,708 B1 | 2/2001 | Hei et al. ................... 423/210 |
| 6,193,934 B1 | 2/2001 | Yang .......................... 422/174 |
| 6,221,325 B1 | 4/2001 | Brown et al. .......... 423/243.06 |
| 6,277,343 B1 | 8/2001 | Gansley et al. ............. 423/210 |
| 6,277,344 B1 | 8/2001 | Hei et al. ................... 423/210 |
| 6,284,022 B1 | 9/2001 | Sachweh et al. ............. 95/149 |
| 6,302,945 B1 | 10/2001 | Altman et al. ................. 96/44 |
| 6,312,505 B1 | 11/2001 | McQuigg et al. ............. 95/218 |
| 6,531,104 B1 * | 3/2003 | Borio et al. ........... 423/243.01 |
| 2001/0033817 A1 | 10/2001 | Sander .................... 423/239.1 |
| 2001/0045162 A1 | 11/2001 | McQuigg et al. ............. 95/218 |

* cited by examiner

SULFUR DIOXIDE REMOVAL USING AMMONIA

CROSDS REFERENCE TO RELATED APPLICATIONS

This is a continuation-in-part of U.S. Ser. No. 09/683,267, filed Dec. 6, 2001, pending.

BACKGROUND OF INVENTION a. Field of the Invention

This invention relates to methods and apparatuses for removing $SO_2$ from a gas stream.

b. Description of the Related Art

Fossil fuels are burned in many industrial processes. Electric power producers, for example, burn large quantities of coal, oil, and natural gas. Sulfur dioxide ("$SO_2$") is one of the unwanted byproducts of burning any type of fossil fuel. It is known to cause acid rain, and to have serious negative health effects on people, animals, and plants. A great deal of research has been done to find a way to economically remove $SO_2$ from flue gas streams before it enters the atmosphere.

$SO_2$ is often removed from gas streams ("desulfurization") by scrubbing the gas with an aqueous ammonium sulfate solution containing ammonia. Examples of this process are disclosed in U.S. Pat. Nos. 4,690,807, 5,362,458, 6,221,325, and 6,277,343, which are not admitted to be prior art by their mention in this Background section. The absorbed sulfur compounds react with ammonia to form ammonium sulfite and ammonium bisulfite, which are then oxidized to form ammonium sulfate and ammonium bisulfate. The ammonium bisulfate is further ammoniated to form ammonium sulfate.

The patents referenced above teach, among other things, that the pH of the ammonium sulfate solution should be kept between about four and six. This range is the result of a compromise between competing factors. On one hand, ammonium sulfate solution is capable of absorbing $SO_2$ more rapidly when its pH is higher. The ability to absorb $SO_2$ better implies that the size of the scrubbing tower can be smaller, thus saving capital costs. In addition, the liquid to gas ("L/G") ratio can be smaller, meaning less liquid will be required and operating costs will be lower.

On the other hand, higher pH levels are also associated with the release of free ammonia from solution, often termed "ammonia slip." In addition to incurring an economic loss because of lost ammonia, free ammonia in the scrubbed flue gas reacts with uncaptured sulfur dioxide and trioxide to create an ammonium sulfate/bisulfite aerosol that is visible as a blue or white plume in the stack discharge, leading to secondary pollution problems. Controlling the amount of free ammonia in the desulfurization process is in part a function of the ammonia vapor pressure, which results from a combination of pH and levels of unoxidized ammonium sulfite that remain in the absence of sufficient oxygen. Therefore, high pH values and high levels of unoxidized ammonium sulfite promote ammonia slip.

One exception is a method disclosed in U.S. Pat. No. 6,063,352 in which the pH is kept between 4.5 and 7. However, this method avoids the formation of aerosols by maintaining a very high ratio of ammonium sulfite to ammonium sulfate. The ratio is on the order of 15:1 to 3:1. Maintaining this ratio in a scrubber on a commercial scale would be very difficult.

In the past, the solution to the problem of removing $SO_2$ from a gas stream prior to the present invention has been a compromise between these two competing factors: maintaining the pH of the ammonium sulfate solution to between about four and six. It is recognized that a pH of greater than six is likely to produce ammonia slip. If the aerosols could be removed from the gas stream, the $SO_2$ removal process could be made much more efficient without the need for compromise. What is needed, therefore, is a process that removes $SO_2$ from a gas stream that can occur at a pH greater than six, and minimizes ammonia slip.

SUMMARY OF INVENTION

The present invention is directed to a process and apparatus that removes $SO_2$ from a gas stream, occurs at a pH greater than six, and minimizes ammonia slip. A process that satisfies these needs comprises the steps of scrubbing $SO_2$ from the flue gas stream with an ammonia scrubbing solution having a pH between six and eight, and removing any ammonia aerosols generated by the scrubbing steps with an aerosol removal means. These and other features, aspects, and advantages of the present invention will become better understood with reference to the following description, drawings, and claims.

DETAILED DESCRIPTION

The present invention is a process and apparatus for removing $SO_2$ from a gas stream, especially from the flue gas stream of a fossil fuel boiler. It is noted that the inventors are familiar with methods and apparatuses for removing $SO_2$, and other substances like NOx and Hg, from gas streams. U.S. Pat. Nos. 5,871,703, and 6,117,403 teach the use of an electrical discharge apparatus to oxidize $SO_2$ and NOx to form sulfuric and nitric acids respectively, collecting the acids in a wet electrostatic precipitator ("WESP") to form an effluent, and processing the effluent to make industrial grade acids that can be sold. The inventors on these two patents are Alix, Neister, and McLarnon, two of whom are inventors of the present invention. U.S. Pat. No. 6,132,692 teaches the use of a dielectric barrier discharge ("DBD") reactor to form the same acids, collecting them in a WESP, and draining them from the WESP to remove them from a gas stream. The inventors on this patent are Alix, Neister, McLarnon, and Boyle, two of whom are inventors of the present invention. The above three patents were owned by the owner of the present invention as of the filing date of this specification. The patents are hereby incorporated by reference as if completely rewritten herein.

Figure 1:
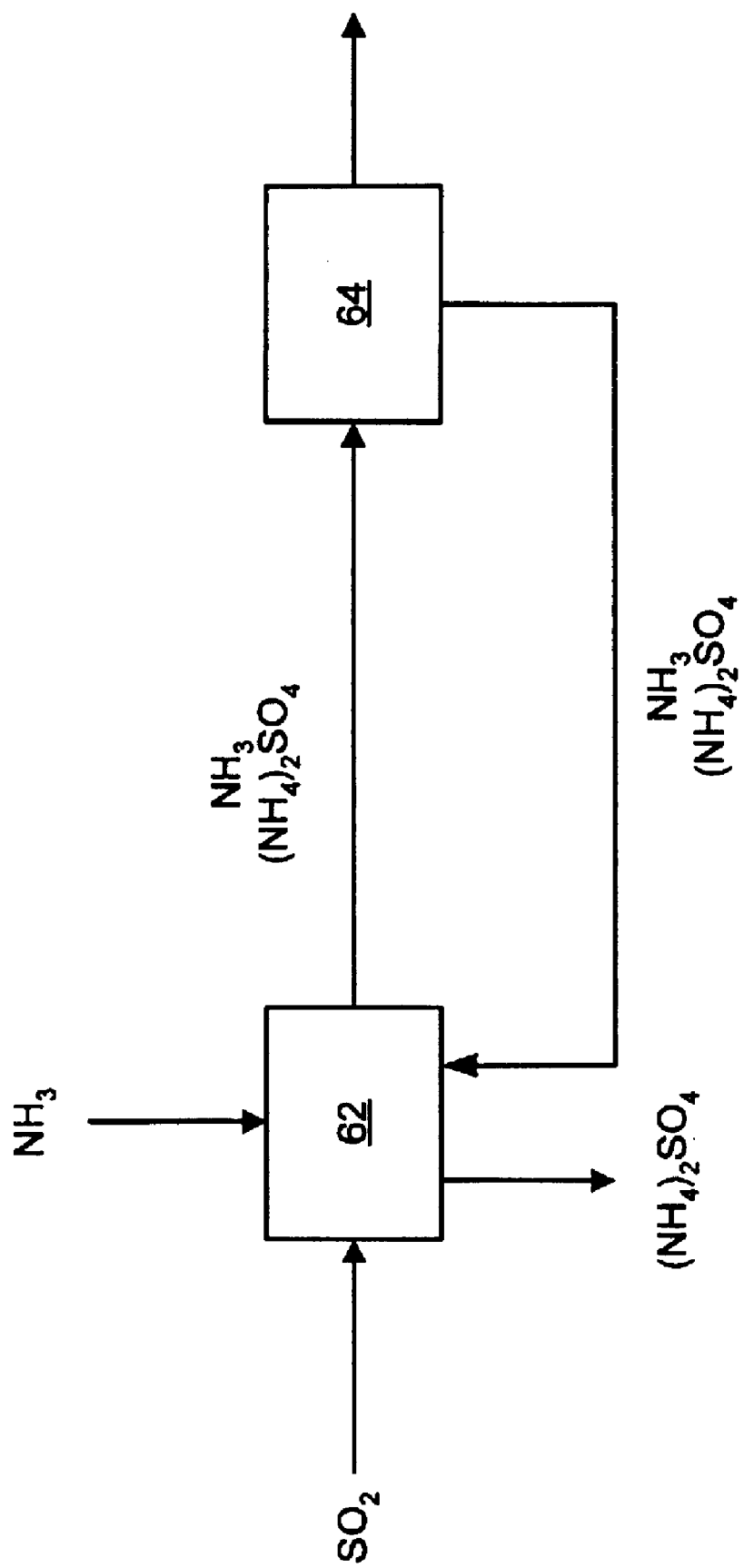
FIG. 1 is a process flow chart showing the process of the present invention.

The present invention comprises a two-step process as shown in FIG. 1. The first step 62 is scrubbing at least a portion of the $SO_2$ present in the gas stream with a scrubbing solution. The term "scrubbing" typically means "absorbing" to people having skill in the art, meaning that $SO_2$ is absorbed by the aqueous solution. However, it is intended that the term "scrubbing" as used in this specification also includes adding anhydrous ammonia gas to initiate the reactions leading to the oxidation of $SO_2$.

The scrubbing solution preferably comprises ammonia, ammonium sulfite, ammonium sulfate, and water. The solution has a pH between six and eight, which is higher than that taught in other patents that disclose a process or apparatus for scrubbing $SO_2$, such as U.S. Pat. Nos. 4,690,807, 5,362,458, 6,221,325, and 6,277,343. These patents teach that the pH must be kept to less than six to prevent the formation of aerosols. However, the present invention is not concerned with avoiding the formation of aerosols because it includes an aerosol removal means 64, described later in this specification.

One exception is the method disclosed in U.S. Pat. No. 6,063,352 (the '352 patent), in which the pH can be kept between 4.5 and 7. Ammonia slip is avoided according to the '352 patent only by maintaining the ratio to ammonium sulfite to ammonium sulfate between 15:1 and 3:1. This is not a constraint of the present invention. In fact, the ratio of sulfite to sulfate is less than 1:1.

Maintaining a nearly neutral pH, e.g. between six and eight, according to the present invention has several benefits. First, it increases the speed of absorption of $SO_2$ when compared with the lower pH of the referenced patents. Second, it also increases the ratio of sulfite available in solution compared to bisulfite, which facilitates the oxidation of $SO_2$. This is so because the ratio of sulfite to bisulfite is highly dependent on pH level, as shown by the experimental data presented as the chart of FIG. 2. Third, the absorption vessel shown as item 44 in FIG. 3, and associated equipment do not have to be made of a more exotic, corrosion-resistant alloy because the pH is nearly neutral.

Fourth, it follows from these benefits that the vessel 44 can be substantially smaller than that used to scrub the same amount of $SO_2$ in a conventional scrubber. It is estimated that the size of the absorption vessel 44 can be reduced by half, and the liquid to gas ratio can be reduced by up to two-thirds. Because the cost of the absorption vessel and liquid circulating equipment represent a large fraction of the total cost of a scrubber, the ability to substantially reduce the size of the vessel and associated pumps and piping is a major advantage of the present invention over the prior art. In addition, the amount of scrubbing liquid required and the liquid to gas ratio can be reduced, thus reducing operating costs. This runs contrary to the teachings of the referenced patents. For example, U.S. Pat. No. 6,221,325 discloses an $SO_2$ scrubber that operates at a pH between four and six and teaches that the reaction vessel should be "preferably increased by 30% to 60% over conventional requirements . . . " The reason given for increasing the size was to assure complete oxidation of the ammonia to prevent ammonia slip. The present invention is unconstrained by this limitation because an aerosol removal means 64 is provided, thus allowing the process of the present invention to operate at a highly efficient level.

Returning to FIG. 1, ammonia is added to an $SO_2$ gas stream at the scrubbing step 62, but ammonia in the form of ammonium hydroxide can be added instead. The ammonia reacts with the gas stream forming ammonium sulfite and ammonium bisulfite. The likely chemical reactions in this step are as follows:

$$NH_3+H_2O+SO_2 \rightarrow NH_4HSO_3 \qquad (1)$$

$$NH_4HSO_3+NH_3 \rightarrow (NH_4)_2SO_3 \qquad (2)$$

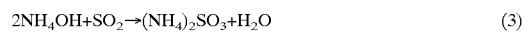
$$2NH_4OH+SO_2 \rightarrow (NH_4)_2SO_3+H_2O \qquad (3)$$

$$2(NH_4)_2SO_3+O_2 \rightarrow 2(NH_4)_2SO_4 \qquad (4)$$

As one can see from the above equations, the process removes $SO_2$ from the gas stream and produces ammonium sulfate. Over time, the ammonium sulfate will concentrate in the aqueous ammonia solution and precipitate out of solution. The solid precipitate can then be removed from the scrubber and processed for use as fertilizer. Since the pH of the scrubbing solution is higher than about six, the remaining output from the scrubbing step will likely contain ammonia, ammonium sulfite, and/or ammonium sulfate aerosols.

The second step 64 is removing at least a portion of the aerosols from the gas stream. A WESP may be used as the aerosol removal means. A WESP is effective at collecting ammonia and ammonium sulfate aerosols, and many other aerosols or particles that may be present in the gas stream. A fossil fueled boiler may already need to employ a WESP to control fine particles and aerosol emissions. A pre-existing WESP, or one used to collect other emissions in addition to $SO_2$, will greatly reduce the cost of the $SO_2$ removal system of the present invention. As a result of this two-step process, $SO_2$ is removed from a gas stream to provide ammonium sulfate.

Figure 3:
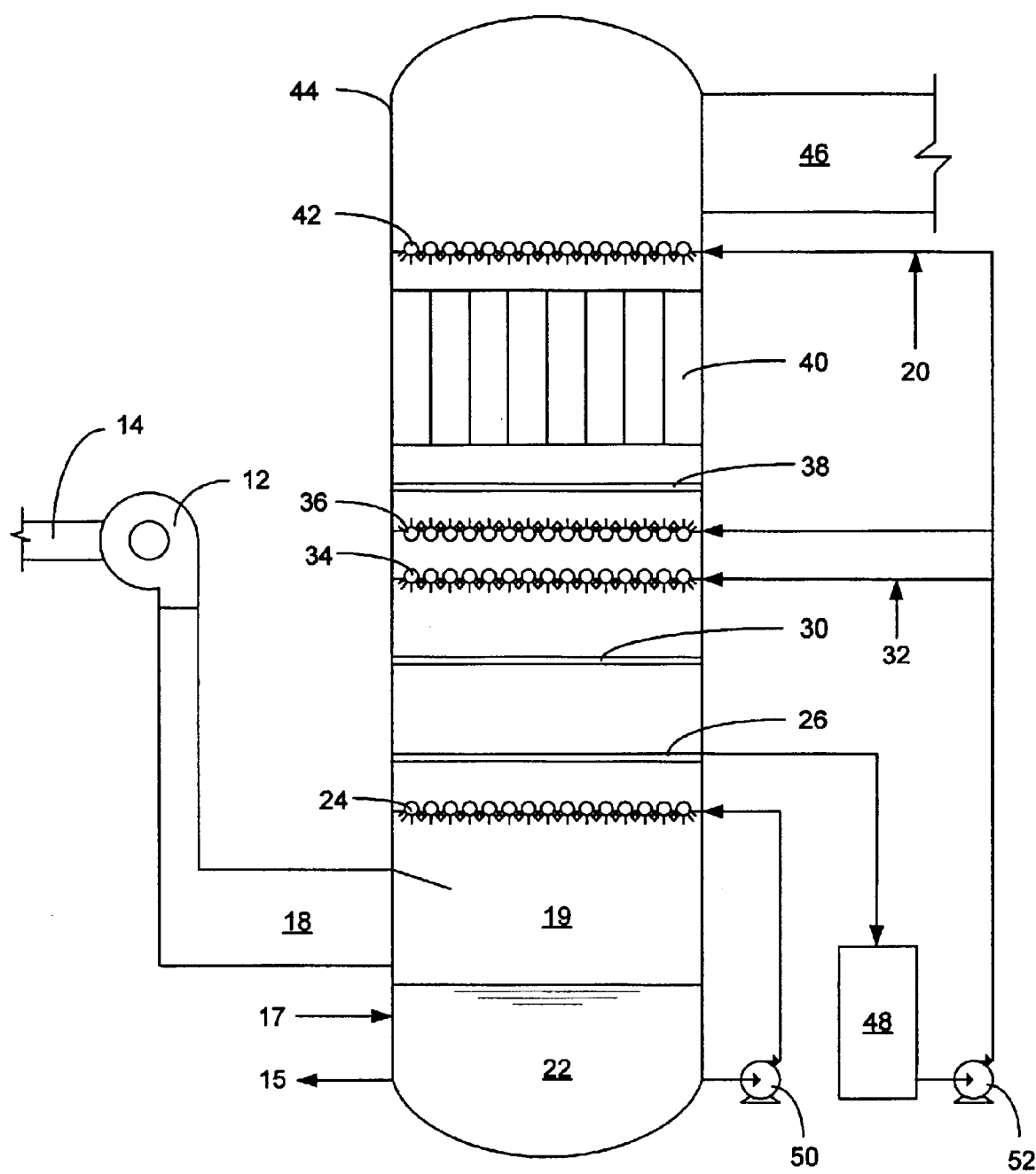
FIG. 3 is a cut-away view of an apparatus according to the present invention.

An apparatus according to the present invention is shown in FIG. 3. A gas stream comprising $SO_2$ 14 enters the apparatus optionally assisted by a forced draft fan 12. The gas stream temperature at this point is between about 116 and 149° C. (240 and 300° F.). The gas stream then enters a scrubbing vessel 44 in a region 19 over an aqueous ammonium sulfate solution 22. Preferably, the aqueous ammonium sulfate solution comprises ammonia, ammonium sulfite, ammonium sulfate, and water. Water in the ammonium sulfate solution 22 evaporates due to the heat of the gas stream 18, thus concentrating the solution and causing ammonium sulfate 15 to precipitate out of solution, which is then removed from the vessel 44. The removed ammonium sulfate 15 can then be dried and granulated to produce a saleable fertilizer product.

Air 17 is introduced into the ammonium sulfate solution 22 for oxidizing ammonium sulfite into ammonium sulfate. Ammonium sulfate solution 22 is pumped with a circulation pump 50 to a set of lower spray nozzles 24 that serve to cool and saturate the gas stream 18 with water vapor while concentrating the ammonium sulfate solution.

Another circulation loop is provided wherein aqueous ammonium sulfite and sulfate in a vessel 48 is pumped with a circulation pump 52 to a set of wash spray nozzles 36 and a set of upper spray nozzles 34. The liquid then falls to a dual flow tray 30. A separator tray 26 allows some of the liquid to fall into the ammonium sulfate solution 22, and the remainder is piped to the vessel 48. Additional makeup ammonia 32 is added to the upper spray nozzles 34. These two circulation loops, independently or together, perform the scrubbing step 62 of FIG. 1, which is described in detail above.

Following the scrubbing loops, a WESP 40 is provided to remove any ammonia or ammonium sulfate aerosols that may have formed earlier in the process. As used in this specification, the term "ammonia aerosols" shall be construed to mean any or all of ammonia-containing particles, droplets, and vapor. The WESP 40 is preferably a shell-and-tube type of WESP, but can be a plate type, condensing type, or any WESP such as is known by those having skill in the art. The WESP 40 is wetted using a set of sprays 42 fed by the ammonium sulfite and sulfate vessel 48 and circulation pump 52 via a conduit 20. A mist eliminator 38 can be provided below the WESP 40. The WESP 40 and mist eliminator 38 are examples of the aerosol removal means 64 described in FIG. 1. The gas stream 46 exiting the WESP 40 has considerably less $SO_2$ than that which entered the process and apparatus.

An alternative flow can be added that also helps minimize ammonia slip consisting of some of the ammonia sulfate solution 22 pumped by pump 50 directly to the WESP sprays 42. This alternative embodiment is not shown in the drawings.

The following is a laboratory-scale example that demonstrates the efficacy of the present invention:

EXAMPLE 1

An experiment was performed to demonstrate the scrubbing step of the present invention. A 3.8 cm (1.5 inch) diameter column packed with 46 cm (18 inches) of 5 mm RASCHIG rings was used to test the $SO_2$ scrubbing rate in a ten percent ammonium sulfate solution as a function of pH. The ammonium sulfate solution was initially pH adjusted with 96 wt. % $H_2SO_4$ for pH<5 and 28 wt. % $NH_3$ for pH>5. The following conditions were used for all of the testing: gas flow rate=17.5 L/min., liquid flow rate of 38 mL/min., $SO_2$ concentration=1350–1390 ppmv, NO concentration=250 ppmv, $O_2$ concentration=6 wt. %, and liquid temperature= 52° C. (125° F.). The testing was done in a once-through mode, and the pH of the solution was determined on the inlet and outlet of the column.

Figure 4:
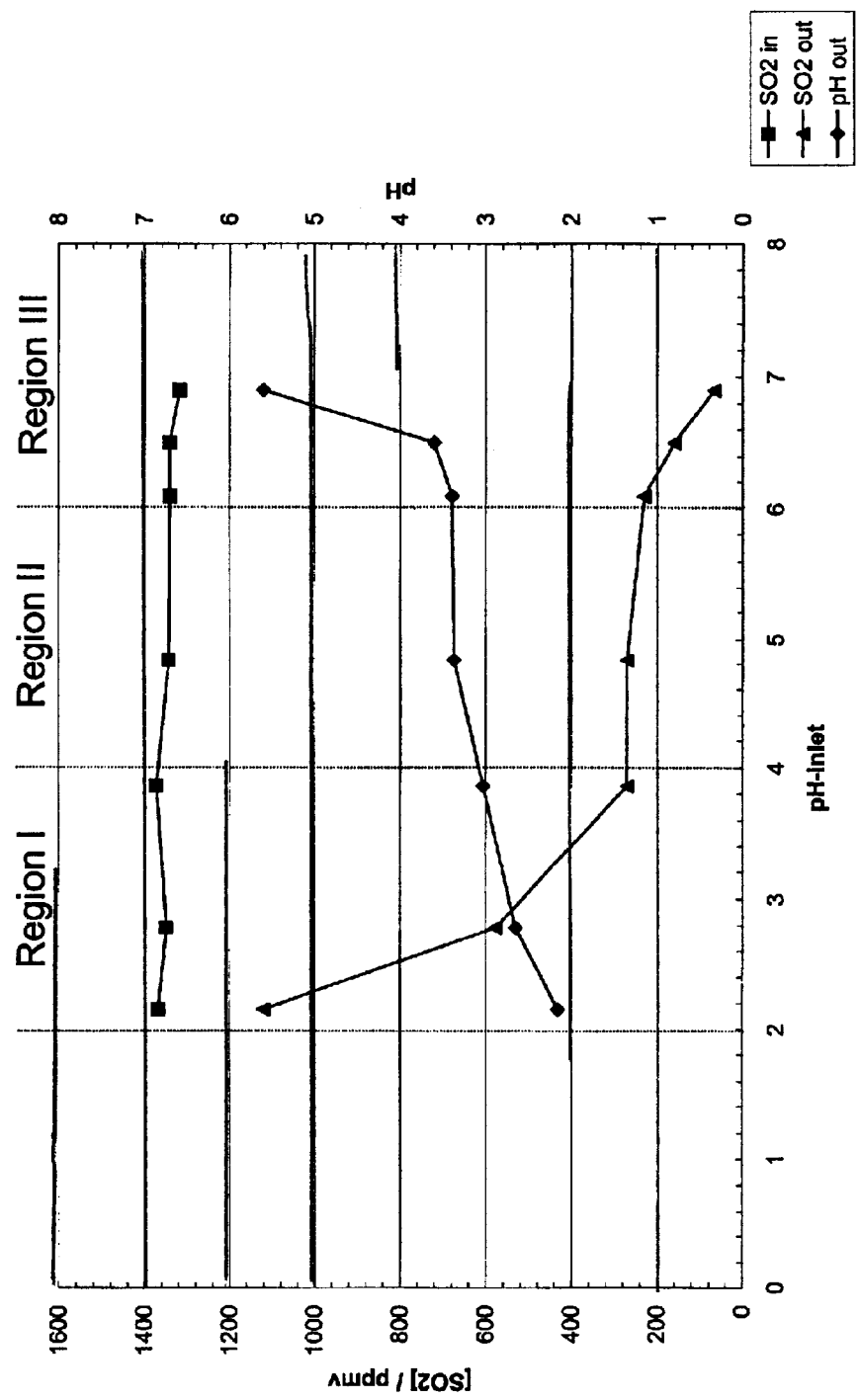
FIG. 4 is a chart showing $SO_2$ removal as a function of pH.

FIG. 4 is a chart showing the results of this example experiment. In FIG. 4, it is clear that the scrubbing rate of $SO_2$ increases with increasing pH, as shown by comparing outlet to inlet $SO_2$ concentrations. There are three distinct regions. In Region I, the pH ranges from two to four. As the pH approaches two, the scrubbing rate of $SO_2$ approaches zero. As the pH increases to four, the $SO_2$ scrubbing rate increases significantly. In Region II, where pH ranges from four to six, the increase in pH does not increase the $SO_2$ scrubbing rate. Finally, in Region II, where pH is greater than six, there is another significant increase in the $SO_2$ scrubbing rate.

The likely reason for the increase in the $SO_2$ scrubbing rate in Region I is an increase in the free ammonia available in the solution. For Regions I and II, the scrubbing mechanism is likely the formation of ammonium sulfite. The scrubbing rate is determined by the concentration of $SO_2$ and $NH_3$ available for the reactions described by equations (1) and (2) above.

In an ammonium sulfate solution, the amount of NH available for scrubbing is determined by the pH of the solution because of the $NH_3/NH_4^+$ equilibrium (see equation (5)). As the pH rises from two to six, the concentration of $H_3O^+$ decreases, driving the equilibrium towards more $NH_3$.

$$NH_4^+ + H_2O \leftrightharpoons NH_3 + H_3O^+ \tag{5}$$

The second increase in the $SO_2$ scrubbing rate seen in Region III is likely due to a second scrubbing mechanism becoming available as follows:

$$(NH_4)_2SO_3 + SO_2 \rightarrow 2NH_4HSO_3 \tag{6}$$

For the same reasons that the free ammonia available is driven by pH, equation (7) is also determined by pH because of the $SO_3^{2-}/HSO_3^-$ equilibrium:

$$HSO_3^- + H_2O \leftrightharpoons SO_3^{2-} + H_3O^+ \tag{7}$$

Figure 2:
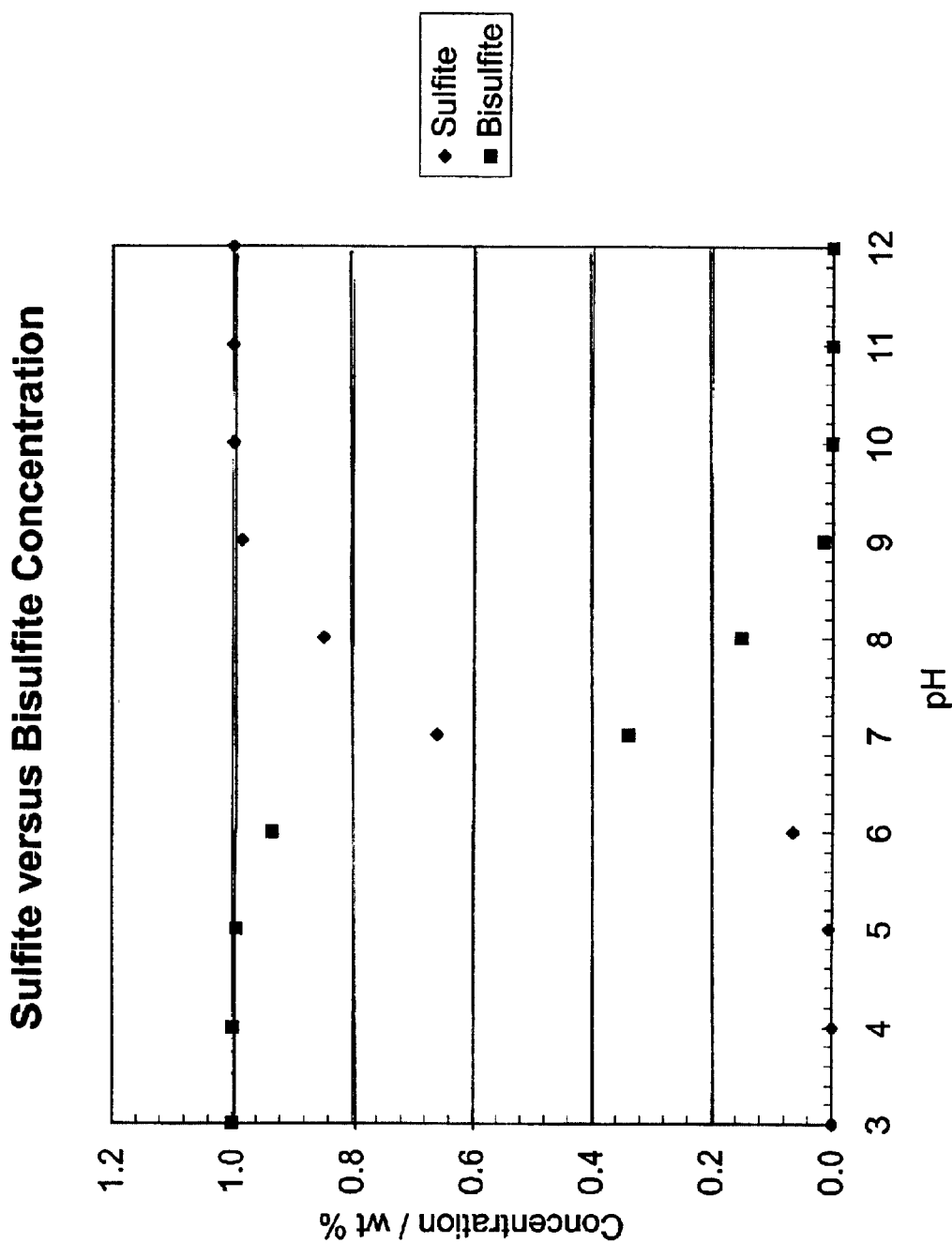
FIG. 2 is a chart showing sulfite versus bisulfite concentration as a function of pH.

FIG. 2 shows the relative concentrations of sulfite to bisulfite in a solution with a total sulfite concentration of one percent by weight. The shift from all bisulfite in solution to all sulfite in solution occurs at the same pH at which the $SO_2$ scrubbing rate makes its second increase. As the sulfite concentration is increased in the solution, the $SO_2$ scrubbing rate is also increased.

The two-step process and apparatus described herein was designed specifically to treat flue gas from a coal fired power plant. However, it can be appreciated that the invention is capable of operating on any gas stream in which $SO_2$ is present, including but not limited to gas and oil-fired boilers and various chemical manufacturing processes.

It will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A process for removing $SO_2$ from a gas stream comprising the steps of
   a. scrubbing at least a portion of the $SO_2$ from a gas stream with a scrubbing solution comprising ammonia, ammonium sulfite, ammonium sulfate, and water; having a sulfite to sulfate ratio of less than 1:1; and having a pH between 6 and 8; and
   b. removing at least a portion of any aerosols generated from the scrubbing step from the gas stream with an aerosol removal means.

2. The process of claim 1, wherein said aerosol removal means is a wet electrostatic precipitator.

3. The process of claim 1, wherein said scrubbing step results in the formation of ammonium sulfate, the process further comprising the step of withdrawing ammonium sulfate from the scrubbing solution.

* * * * *